March 25, 1930. L. P. BARLOW Re. 17,627
ENGINE COOLING SYSTEM
Original Filed Aug. 5, 1926
Fig. 2.
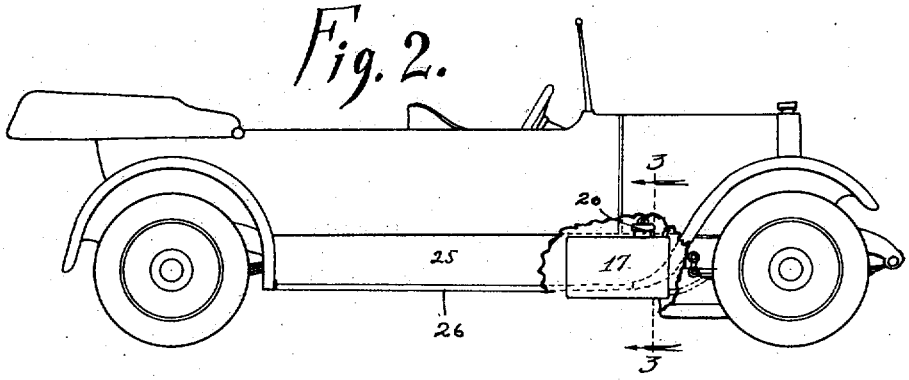
Fig. 3.
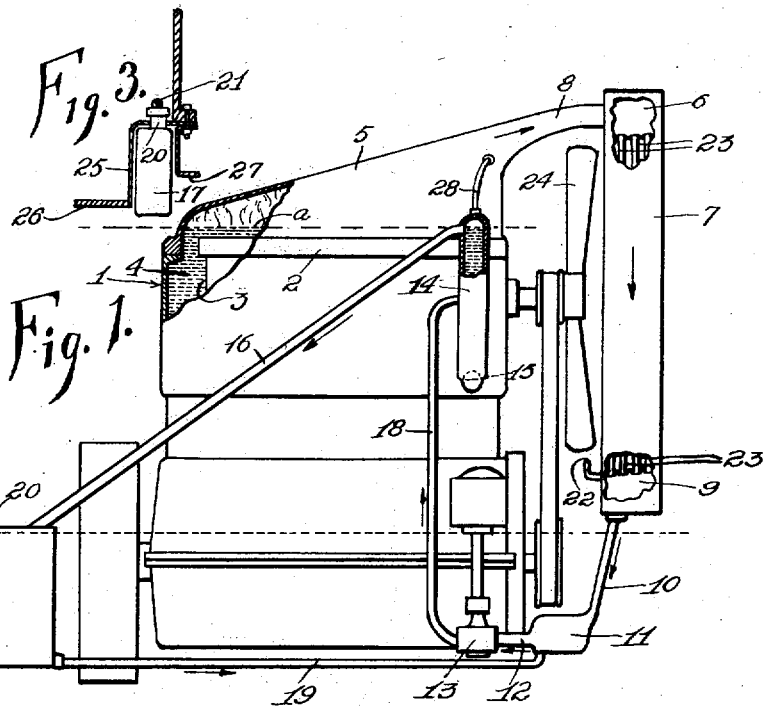
Fig. 1.
Fig. 4.
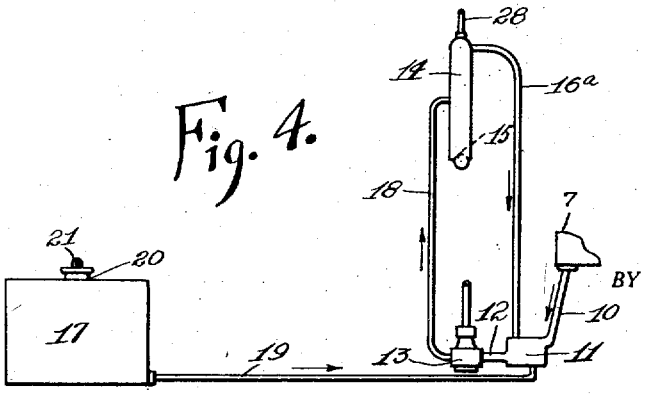
INVENTOR:
Lester P. Barlow,
BY
Wilson Evans
ATTORNEY.

Reissued Mar. 25, 1930 Re. 17,627

UNITED STATES PATENT OFFICE

LESTER P. BARLOW, OF DETROIT, MICHIGAN

ENGINE-COOLING SYSTEM

Original No. 1,632,581, dated June 14, 1927, Serial No. 127,257, filed August 5, 1926. Application for reissue filed March 18, 1929. Serial No. 348,101.

This invention relates to vapor cooling systems for internal combustion engines and more particularly those employed on automobiles, trucks, and other motor vehicles.

One object of my invention is to deliver to the jacket of the engine cylinders on starting the engine only enough liquid to fill the jacket to a predetermined level above the cylinders and then cease the flow of liquid to the jacket until the liquid therein reaches the boiling point, thereby allowing the engine to be warmed up quickly regardless of the outside atmospheric temperature in which the engine is started.

Another object of my invention is to automatically supply cooling liquid to the cylinder jacket in exact proportions to the amounts of liquid going off as steam from the surface of the liquid body in the jacket from time to time during the steaming operation, and thus automatically maintain a substantially constant liquid level above the cylinders to prevent either flooding the jacket to stop the steaming operation or the boiling away of the liquid body to overheat the cylinders.

A further object of my invention is to supply the cooling liquid to the cylinder jacket through a standpipe or chamber having a by-pass at the height of the liquid level for the jacket, so as to regulate said level in the jacket yet allow for a continuous and uninterrupted circulation of liquid through the chamber to supply the jacket without any of the excess liquids passing therethrough.

A further object of the invention is to provide a cooling system which will be open continuously to the atmosphere so that it will operate at all times at atmospheric pressure.

A further object of my invention is to so position the supply and reserve tank of the system that it may be readily reached for filling and so that the level of the cooling liquid therein will be below the level of the cylinder jacket.

A still further object of my invention is to locate this tank under the apron along the running board at the side of the car and utilize a place not heretofore generally used for this purpose.

The invention consists further in the matters hereinafter described and claimed.

In the accompanying drawings:—

Figure 1 is a side view (more or less diagrammatic) of an automotive power plant assembly equipped with a vapor cooling system constructed in accordance with my invention.

Figure 2 illustrates the supply and reserve tank of the system located beneath the apron of the running-board at one side of the car.

Figure 3 is a vertical sectional view taken on line 3—3 of Figure 2, and

Figure 4 illustrates a modified form of construction to be hereinafter described.

In Figure 1, 1 indicates the cylinder block of an internal combustion engine, and 2 the head clamped on top of the block over the upper ends of the engine cylinders 3 therein, as usual in motor vehicle engine designs. Block 1 is provided with the usual chamber 4 about the engine cylinder so as to receive the cooling liquids, as water, as heretofore, said chamber defining the water jacket about the cylinder, as usual. The head 2 has a vapor collecting space or steam dome 5 extending above the head and in direct communication at all times at its lower end with the upper end of the chamber 4 so as to receive the steam rising from the body of the liquid in the chamber when brought to the boiling temperature from the heat of the explosions in the cylinders during the operation of the engine.

The dome 5 is connected with a header or chamber 6 at the upper end of a cooler or condenser 7 by a conduit 8. The condenser may take the form of an automobile radiator with water tubes and air passages so as to fit in with the present automobile designs. The lower portion of the condenser 7 is provided with a condensate collecting header or chamber 9, which is connected by a downwardly extending conduit 10 with a manifold 11 arranged below the condenser, as shown in Figure 1, so that any condensate which reaches chamber 9 is at once drained from it. The manifold 11 is connected by a conduit 12 with the intake of a pump 13, also located below the level of the lower end of condenser 7 and driven from the engine in any desired manner.

At one side of the block 1 is a stand-pipe 14 opening at its lower end into the lower portion of the cylinder jacket through its liquid intake port 15. Through this standpipe liquid is supplied to the cylinder jacket 4 and maintained therein at a level *a* in the lower portion of the dome 5 and above the cylinders, as shown in Figure 1. The standpipe 14 extends upward from the port 15 to the water level *a* in the dome 5 and is connected at that level by an outlet or overflow pipe or conduit 16 with a supply tank or reservoir 17 located below the level of the lower end of condenser 7, as shown. A supply conduit 18 connects the standpipe 14 with the discharge outlet of the pump 13, so that said pump when in operation delivers liquid to the standpipe and through the same supplies liquid to the jacket 4 to the level *a* therein.

The tank or reservoir 17 is connected with the manifold 11 on the intake side of the pump by a conduit 19 so as to supply make-up water to the system and permit the liquids to circulate through the standpipe 14 and its intake and overflow conduits 18 and 16 without passing through the cylinder jacket and the dome. The tank 17 has a capacity to contain all the liquid required for the system and sufficient in addition to constitute a reserve supply and thus compensate for natural losses through leakage and evaporation. Said tank 17 has a filling neck 20, the closure cap of which has a vent opening 21 to the atmosphere. Another vent 22 to the atmosphere is provided for the condenser 7 at its lower condensate collecting chamber 9, said vent having its opening from chamber 9 above the level of the liquid in the supply tank 17, as shown. To balance the pressure in the dome 5 and in the regulating chamber 14, I provide a connection between them by a pipe 28, as shown in Figure 1.

As shown in Figure 1, the tubes 23, 23, of the condenser 7 are vertically disposed and connect the upper steam receiving chamber 6 with the lower condensate collecting chamber 9. These tubes are spaced apart so that air flowing through the condenser from front to rear will contact with the tubes to cool them and cause the steam passing downward through the tubes to be condensed and returned to liquid form to the system through the condensate collecting chamber 9. A fan 24 is located at the rear of the condenser 7 and is operated by the engine in the usual manner to draw air through the condenser for steam condensing purposes, as stated.

On first placing the system in operation, the tank or reservoir 17 is completely filled with cooling liquid through the neck 20 to the level indicated by the dotted line *b*. As the tank is so located as to extend above the pump 13 and manifold 11, these two elements as well as the conduits 12 and 19 and the portions of the conduits 10 and 18 below the level *b* are filled with liquid, thus priming all of the parts and not delaying their filling on starting the engine. Any excess of liquid supplied to supply tank or reservoir 17 will overflow neck 20 so that the liquid in tank 17 and in conduit 19, manifold 11 and conduits 12 and 10 cannot rise above the level indicated by dotted line *b* and cannot reach condensate collecting chamber 9 and, of course, cannot close the inner end of vent 22 which is thus at all times open to the outside atmosphere. Being thus at all times open to the outside atmosphere by vent 22 the pressure in the condenser portion of the cooling system cannot exceed or be lower than atmospheric pressure. By reason of the connection 28 above the level of the level of the liquid in the water jacket and the connection between condensate collecting chamber 9 and tank 17, below the level of the liquid indicated by dotted line *b*, the supply portion of the system will also be continuously maintained at atmospheric pressure, vent 21 on supply tank 17 aiding in maintaining the supply portion of the system at atmospheric pressure.

The cooling system is thus open continuously to the atmosphere and operates throughout both on the condenser side and on the supply side at all times at the pressure of the outside atmosphere.

On first starting the motor or engine, the pump 13 draws liquid from the tank 17 and delivers it to the jacket chamber 4 through the conduit 18 and standpipe 14. The pump fills the jacket chamber 4 to approximately the level indicated by *a*, whereupon the flow to the jacket ceases, due to the fact that the overflow pipe 16 is connected with the upper end of the standpipe 14, at the height of the level *a*. The pump continues to operate and by the bypass 16 circulates the excess liquid back through the tank without passing through the jacket, and thus making no change in the level *a*. From the fact that the flow of liquid to the jacket ceases when level *a* has been reached, the engine is allowed to warm up rapidly and bring the liquid in the jacket to the boiling point in a relatively short period of time and thus quickly raise the walls of the engine cylinders to the desired economical operating temperature, regardless of load conditions on the engine or the outside atmospheric temperature.

When the liquid in the jacket 4 reaches boiling or steaming temperature, steam rises from the level *a* of the liquid in the jacket and flows to the condenser 7 through the outlet conduit 8. The level *a* in the jacket is being constantly lowered to a slight extent by portions of the liquid body in the jacket going off as steam from the heat furnished by the explosions in the cylinders, thereby allowing the pump to constantly supply liquid to the jacket through the standpipe 14 to make up or compensate for the amounts going off as steam. As the bypass or overflow conduit 16 opens into the standpipe 14 in the plane of the level *a* in the jacket, it follows that no more make-up liquid will be supplied to the jacket 4 than enough to compensate for the amounts going off as steam in the jacket. Thus the amounts of liquid supplied to the jacket from time to time during the boiling of the liquid in the jacket will be in direct proportion to the amounts of liquid going off as steam in the jacket. This is an important feature of my invention because not enough of the cooler liquid is supplied to the jacket at any time during the steaming operation to interfere with or hinder the same, thereby maintaining the cylinder walls of the engine at a substantially constant operating temperature regardless of load and atmospheric temperature conditions. While considerably more amounts of the liquid about the engine cylinders will be converted into steam from time to time during the operation of the engine under heavier loads than under lighter loads, yet the amount of cooler liquid supplied to the jacket under a heavier load from time to time will not be sufficient to so hinder the steaming action in the jacket as to materially reduce the operating temperature of the cylinder walls.

Steam entering the chamber 6 at the top of the condenser 7 will be forced downward through the tubes 23, 23, by the pressure in the dome 5. The tubes being cooled by the circulation of air against them, will cause the steam therein to be condensed therein, the condensate flowing by gravity to the lower chamber 9. From there, the condensate liquid will flow downward into the manifold 11 through the conduit 10, and thus be collected to be taken up by the pump 13 and be returned to the system for resupplying the jacket with liquid in proportion to the amounts going off as steam therein.

I prefer, when my improved system is used with automobiles, to place the supply and reserve tank 17 in a position where it may be readily reached for filling through the neck 20, from the exterior of the car. In Figures 2 and 3 of the drawings, I have shown the tank 17 located in the space between the apron 25 and the running-board 26 at one side of the car and the adjacent side member 27 of the frame or chassis of the machine. The tank 17 has its filling neck 20 extended upward through an opening in the apron 25 so that it may be reached for filling the tank from the outside of the car. To avoid the use of unduly long conduits 16 and 19 between the tank and the associated parts of the system I prefer to position the tank toward the front end of the car, as shown in Figure 2.

While I have shown in Figure 1 the overflow conduit 16 as connecting the standpipe 14 directly with the tank 17, I may arrange this overflow pipe 16[a] so as to connect the upper end of the stand pipe at the water level *a* with the intake side of the pump 13, as shown in Figure 4. This arrangement shortens the distance of flow from the standpipe 14 to the intake of the pump, which may be desired in some installations. Moreover, by this arrangement the return flow from the standpipe 14 to the pump is not through the supply tank 17 to disturb or heat the same as with the assembly shown in Figure 1.

While I have shown and described the standpipe 14 as made separate from the cylinder block 1, it could be formed integral with said block, as by making a suitable passage or alcove therein. In either case, it would serve as a chamber to regulate the level of the liquid body about the cylinders and also enable the liquid to be supplied to said body in direct proportion to the amounts going off as steam therefrom during the steaming operation. After the system has been initially filled with liquid through the tank 17, no further filling is required over relatively long periods of time, as practically all steam generated in the jacket is condensed and returned to the system. On stopping the motor steam will continue until the temperature of the cylinder walls drops below the boiling point of the liquid used. The pump 13 being idle, no liquid will be supplied to the jacket to make-up for the amounts going off as steam. The level *a* will naturally lower, it being raised, however, to the height required on the first starting of the engine.

The details of construction and arrangement of parts may be variously changed and modified without departing from the spirit and scope of my invention.

I claim as my invention:—

1. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, and means included in said circuit and connected with said jacket whereby a predetermined liquid level may be maintained in the jacket by supplying liquid thereto from the circuit in direct proportion to the amounts going off as steam in the jacket.

2. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, said circuit including a liquid level regulating chamber for the jacket and through which the circuit enters the jacket, said chamber having its outlet to the circuit at the height of the liquid level for the jacket in order to maintain such level by supplying liquid to the jacket from the circuit in direct proportion to the amounts going off as steam in the jacket.

3. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, said circuit including a liquid level regulating chamber for the jacket and through which the circuit enters the jacket, said chamber having its outlet to the circuit at the height of the liquid level for the jacket in order to maintain such level by supplying liquid to the jacket from the circuit in direct proportion to the amounts going off as steam in the jacket, and a supply and reserve reservoir in constant communication with said circuit.

4. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, a liquid level regulating chamber for the jacket and a forcing pump in said circuit with the latter entering the jacket through said chamber, a reservoir in the circuit, said chamber having its inlets and outlets connected with the discharge of the pump and with the reservoir, respectively, the outlet of said chamber being at the height of the liquid level for the jacket in order to maintain said level by supplying liquid to the jacket from the circuit in direct proportion to the amounts passing off as steam in the jacket.

5. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through the jacket, said circuit including a liquid level regulating chamber for the jacket and connected with the intake thereat, said chamber having its outlet to the circuit at the height of the liquid level for the jacket in order to maintain such level by supplying liquid to the jacket from the circuit in direct proportion to the amounts going off as steam in the jacket, and a condenser connected at its upper end with the steam space and at its lower end with the return side only of said circuit for supplying condensate thereto.

6. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, said circuit including a standpipe arranged outside of the jacket and through which standpipe the circuit enters the jacket for supplying liquid thereto, said standpipe having inlet and outlet openings included in the circuit with the outlet opening at the height of the liquid level for the jacket.

7. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through said jacket, said circuit including a standpipe arranged outside of the jacket and connected at its lower end with the intake of the jacket for supplying liquid thereto, said standpipe having inlet and outlet openings included in the circuit with the outlet openings at the height of the liquid level for the jacket, and a condenser connected at its upper end with the steam space and at its lower end with the return side only of the circuit for supplying condensate thereto.

8. In an internal combustion engine vapor cooling system which is open continuously to the atmosphere and which operates at all times at atmospheric pressure, the combination with a cylinder jacket having a steam space above the same, of means providing a circuit whereby a cooling liquid may be continuously circulated without passing through the jacket, said circuit including a chamber connected with the intake of the jacket for supplying liquid thereto, said chamber having its outlet to the circuit at the height of the liquid level for the jacket in order to maintain such level by supplying liquid to the jacket from the circuit in direct proportion to the amounts going off as steam in the jacket, a condenser connected at its upper end with the steam space and at its lower end with the return side only of said circuit for supplying condensate thereto, and a pressure balancing connection between the chamber and said steam space.

9. In a cooling system for internal combustion engines, the combination with a cylinder jacket, of means providing a circuit whereby a cooling liquid is circulated without passing through said jacket, means to maintain the cooling liquid at a predetermined level in the jacket, and a vent for said system, said vent being continuously open to the atmosphere whereby the system operates at all times at atmospheric pressure.

10. In an internal combustion engine vapor cooling system which is open continuously to the atmosphere and which operates at all times at atmospheric pressure, the combination with a cylinder jacket having a steam space above the same, of means providing a circuit whereby cooling liquids may be continuously circulated without passing through said jacket, said circuit including a chamber connected with the intake of the jacket for supplying liquids thereto, and a supply and reserve reservoir connected with said circuit for supplying liquids thereto, said chamber having its outlet for liquids connected with the reservoir and disposed at the height of the liquid level to be maintained in the jacket.

11. In an internal combustion engine vapor cooling system which is open continuously to the atmosphere and which operates at all times at atmospheric pressure, the combination with a cylinder jacket having a steam space above the same, of means providing a circuit whereby cooling liquids may be continuously circulated without passing through said jacket, said circuit including a chamber connected with the intake of the jacket for supplying liquids thereto, a supply and reserve reservoir connected with the circuit for supplying liquids thereto, and a condenser connected with said steam space and the return side, respectively, of the circuit for supplying condensate thereto, said chamber having its outlet for liquids connected with the reservoir and disposed at the height of the liquid level to be maintained in the jacket.

12. In an internal combustion engine vapor cooling system which is open continuously to the atmosphere and operating at all times at atmospheric pressure, the combination with a cylinder jacket, of means for supplying cooling liquid to said jacket comprising means for circulating the cooling liquid without passing through said jacket, and means for so controlling the admission of liquid from said circuit to the jacket as to maintain the cooling liquid in the jacket at a predetermined level.

13. In a cooling system for internal combustion engines, a cylinder jacket having a steam space above it, a condenser connected at its upper end with said steam space and extending downward, a liquid forcing means below the level of the lower end of the condenser having its intake connected therewith, a vent open to the atmosphere leading from the lower portion of the condenser, a supply tank for cooling liquid connected with the intake of the liquid forcing means, a liquid level regulating chamber in communication with the cylinder jacket connected with the delivery side of the liquid forcing means and having near its upper end an overflow opening in communication with the supply tank, the supply tank being so located with reference to the cylinder jacket and the liquid forcing means that the overflow from the liquid level regulating chamber will flow by gravity to the supply tank and from the supply tank to the intake of the liquid forcing means.

14. In a cooling system for internal combustion engines comprising a cylinder jacket having a steam space above it, a circuit for supplying liquid to the cylinder jacket, said circuit including therein a liquid forcing means, and a liquid level regulating means connected with the intake of the cylinder jacket, a reservoir for the cooling liquid in communication with the liquid level regulating means and so arranged that liquid will flow downward from the liquid level regulating means to said reservoir, a condenser connected at its upper end with the steam space above the cylinder jacket and having its lower portion in communication with the intake of the liquid forcing means and with the reservoir, a vent open to the atmosphere leading from the lower portion of the condenser and means for maintaining the level of the liquid between the lower end of the condenser and the intake of the liquid forcing means below the level at which said vent is in communication with the condenser.

15. In a cooling system for internal combustion engines comprising a cylinder jacket having a steam space above it, a circuit for supplying cooling liquid to the cylinder jacket, including therein a pump, a liquid level regulating chamber in communication with the pump and with the intake of the cylinder jacket and a reservoir below the level of the intake of the cylinder jacket in communication with the liquid level regulating chamber, and a condenser in communication at its upper end with the steam space above the cylinder jacket and having its lower portion in communication with the intake of the pump and with the reservoir, a vent open to the atmosphere leading from the lower portion of the condenser and a vent in the reservoir open to the atmosphere at a level below the level at which the vent leading from the lower portion of the condenser is in communication with the condenser.

16. In a cooling system for internal combustion engines comprising a cylinder jacket having a steam space above it, a circuit for supplying liquid to the cylinder jacket including therein a pump, a liquid level regulating chamber in communication with the intake of the cylinder jacket and with the pump, a reservoir for the cooling liquid below the level of the intake of the cylinder jacket in communication with the liquid level regulating chamber and with the pump, a vent in the reservoir open to the atmosphere, a condenser in communication at its upper end with the steam space above the cylinder jacket and in communication at its lower end with the intake of the pump and with the reservoir, and a vent open to the atmosphere leading from the lower portion of the condenser at a level above that of the vent of the reservoir.

17. In a cooling system for internal combustion engines comprising a cylinder jacket having a steam space above it, a circuit for supplying liquid to the cylinder jacket including therein a pump, a liquid level regulating chamber in communication with the intake of the cylinder jacket and with the pump, a reservoir for the cooling liquid below the level of the intake of the cylinder jacket in communication with the liquid level regulating chamber and with the pump, a vent in the reservoir open to the atmosphere, a condenser in communication at its upper end with the steam space above the cylinder jacket and in communication at its lower end with the intake of the pump and with the reservoir, and a vent open to the atmosphere leading from the lower portion of the condenser at a level above that of the vent of the reservoir, and means providing open communication between the liquid level regulating chamber and the steam space above the cylinder jacket.

LESTER P. BARLOW.